(12) United States Patent
Kim et al.

(10) Patent No.: US 12,344,281 B2
(45) Date of Patent: Jul. 1, 2025

(54) METHOD OF CONTROLLING SWITCHING TIME TO MANUAL DRIVING MODE OF AUTONOMOUS VEHICLE

(71) Applicants: Hyundai Motor Company, Seoul (KR); Kia Corporation, Seoul (KR)

(72) Inventors: In Su Kim, Whasung-Si (KR); Myung Ki Yeom, Whasung-Si (KR)

( * ) Notice: Subject to any disclaimer, the term of this patent is extended or adjusted under 35 U.S.C. 154(b) by 188 days.

(21) Appl. No.: 18/127,491

(22) Filed: Mar. 28, 2023

(65) Prior Publication Data
US 2024/0174268 A1   May 30, 2024

(30) Foreign Application Priority Data
Nov. 30, 2022   (KR) .................. 10-2022-0163632

(51) Int. Cl.
*B60W 60/00* (2020.01)
(52) U.S. Cl.
CPC .... *B60W 60/0057* (2020.02); *B60W 60/0053* (2020.02); *B60W 60/0059* (2020.02); *B60W 2510/1005* (2013.01); *B60W 2520/105* (2013.01); *B60W 2520/14* (2013.01); *B60W 2540/12* (2013.01); *B60W 2540/16* (2013.01); *B60W 2540/18* (2013.01); *B60W 2540/215* (2020.02)
(58) Field of Classification Search
CPC ......... B60W 60/0057; B60W 60/0059; B60W 60/0053; B60W 2540/215; B60W 2510/1005; B60W 2520/105; B60W 2520/14; B60W 2540/12; B60W 2540/16; B60W 2540/18
See application file for complete search history.

(56) References Cited

U.S. PATENT DOCUMENTS

| 10,053,074 | B2 | 8/2018 | Kindberg | |
|---|---|---|---|---|
| 10,093,292 | B2 | 10/2018 | Moore et al. | |
| 2015/0166063 | A1* | 6/2015 | Ishihara | B60W 30/14 701/41 |
| 2019/0204828 | A1* | 7/2019 | Ishikawa | G05D 1/0223 |
| 2020/0089225 | A1* | 3/2020 | Sadakiyo | B60W 30/02 |

(Continued)

FOREIGN PATENT DOCUMENTS

| CN | 114555440 A | * | 5/2022 | ............ B60W 10/18 |
|---|---|---|---|---|
| JP | H09161196 A | * | 6/1997 | |

(Continued)

*Primary Examiner* — Justin S Lee
(74) *Attorney, Agent, or Firm* — Morgan, Lewis & Bockius LLP (57) ABSTRACT

A method of controlling a time switching to a manual driving mode of an autonomous vehicle includes determining whether there is a request for switching to the manual driving mode, when there is the request, comparing at least one value of yaw rate, deceleration, and shifting in an autonomous driving route with at least one value of yaw rate, deceleration, and shifting by a driver's manual manipulation amount, and according to a size difference between the at least one value of yaw rate, deceleration, and shifting in the autonomous driving route and the at least one value of yaw rate, deceleration, and shifting by the driver's manual manipulation amount, performing a control operation of variably controlling the time switching from the autonomous driving mode to the manual driving mode.

18 Claims, 6 Drawing Sheets

(56) References Cited

U.S. PATENT DOCUMENTS

| | | | |
|---|---|---|---|
| 2020/0180660 A1* | 6/2020 | Honda | B60W 50/08 |
| 2020/0339135 A1* | 10/2020 | Kasaiezadeh Mahabadi | B60W 30/045 |
| 2021/0053591 A1* | 2/2021 | Kim | B60W 60/0057 |
| 2021/0331734 A1* | 10/2021 | Kim | B62D 15/025 |
| 2023/0060300 A1* | 3/2023 | Rosenbaum | B60W 60/0059 |

FOREIGN PATENT DOCUMENTS

| | | |
|---|---|---|
| KR | 2020-0063314 A | 6/2020 |
| KR | 2022-0019878 A | 2/2022 |

\* cited by examiner

METHOD OF CONTROLLING SWITCHING TIME TO MANUAL DRIVING MODE OF AUTONOMOUS VEHICLE

CROSS REFERENCE TO RELATED APPLICATION

The present application claims priority to Korean Patent Application No. 10-2022-0163632, filed on Nov. 30, 2022, the entire contents of which is incorporated herein for all purposes by this reference.

BACKGROUND OF THE PRESENT DISCLOSURE

Field of the Present Disclosure

The present disclosure relates to a method of controlling a switching time to a manual driving mode of an autonomous vehicle, and more particularly, to a method of controlling a switching time to a manual driving mode of an autonomous vehicle, whereby a time switching from an autonomous driving mode of the vehicle to a manual driving mode of an autonomous vehicle may be variably adjusted according to a driver's manual operation intervention.

Description of Related Art

The driving mode of an autonomous vehicle includes a manual driving mode in which a driver can directly intervene in driving in addition to an autonomous driving mode of the vehicle in which a vehicle is driven to the destination by itself without driver's direct manipulation of a steering wheel, an accelerator pedal, a brake pedal, or the like.

In general, when the driving mode of the autonomous vehicle is switched from the autonomous driving mode to the manual driving mode, there is a predetermined time of switching period (switching time) to secure the stability of the driving mode switching control.

Accordingly, in the switching period in which the driving mode of the autonomous vehicle is switched from the autonomous driving mode to the manual driving mode during the driving of the autonomous vehicle, the autonomous driving control amount by the autonomous driving mode is set to gradually decrease according to a predetermined reduction rate so that the vehicle control authority may be transferred to the driver.

When the autonomous driving control amount by the autonomous driving mode gradually decreases at a predetermined reduction rate, the manual manipulation intervention amount by the driver should gradually increase at the same or a similar increasing rate, and the sum of the autonomous driving control amount and the manual manipulation intervention amount should satisfy the target control amount for the vehicle to stably drive along a predetermined driving route.

For example, the sum of the automatic steering control amount by an autonomous driving controller and the manual steering manipulation amount by the driver need to satisfy the target control amount in the switching period during turning of the autonomous vehicle.

However, because the manual intervention amount by the driver may vary according to the driver's intention to intervene in driving, and driver's driving habit and inclination in the switching period, the vehicle may deviate from the driving route and cause a collision accident.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a manual driving mode-switching time control method in an autonomous vehicle in which upon a request for switching from an autonomous driving mode of the vehicle to a manual driving mode while driving of the autonomous vehicle, values of yaw rate, deceleration, and shifting in an autonomous driving route are respectively compared with values of yaw rate, deceleration, and shifting varied according to the driver's manual manipulation, and according to the size difference between at least one value of yaw rate, deceleration, and shifting in the autonomous driving route and at least one value of yaw rate, deceleration, and shifting by the driver's manual manipulation, a time to switching from the autonomous driving mode to the manual driving mode is variably increasingly or decreasingly controlled, stably switching to the manual driving mode, securing driving safety and preventing collision accidents.

In an aspect of the present disclosure, there is provided a method of controlling a time switching to a manual driving mode of an autonomous vehicle, the method including: determining, by an autonomous driving controller, whether there is a request for switching to the manual driving mode while driving of the autonomous vehicle: when the autonomous driving controller concludes that there is the request for switching to the manual driving mode, comparing, by the autonomous driving controller, at least one value of yaw rate, deceleration, and shifting in an autonomous driving route with at least one value of yaw rate, deceleration, and shifting by a driver's manual manipulation amount; and as a result of the comparing, according to a size difference between the at least one value of yaw rate, deceleration, and shifting in the autonomous driving route and the at least one value of yaw rate, deceleration, and shifting by the manual manipulation amount of the driver, performing, by the autonomous driving controller, a switching control operation of variably controlling the time switching from the autonomous driving mode to the manual driving mode.

If the size difference between the at least one value of yaw rate, deceleration, and shifting by the manual manipulation amount of the driver and the at least one value of yaw rate, deceleration, and shifting in the autonomous driving route is less than a predetermined reference value, the autonomous driving controller may perform the switching control operation for a predetermined reference switching time.

The switching control operation for the predetermined reference switching time may be performed so that a sum of an autonomous driving control amount of the autonomous driving controller and the manual manipulation amount of the driver meets a predetermined target control amount for the predetermined reference switching time from a request time for the manual driving mode.

On the other hand, when the size difference between the at least one value of yaw rate, deceleration, and shifting by the manual manipulation amount of the driver and the at least one value of yaw rate, deceleration, and shifting in the autonomous driving route is not less than the predetermined reference value, the autonomous driving controller may perform the switching control operation for a first switching time faster than the predetermined reference switching time or a second switching time slower than the predetermined reference switching time.

The first switching time may be determined as an arbitrary time obtained by shortening the time switching from the autonomous driving mode to the manual driving mode by a predetermined level compared to the predetermined reference switching time, and the second switching time may be determined as an arbitrary time obtained by increasing the time switching from the autonomous driving mode to the manual driving mode by a predetermined level compared to the predetermined reference switching time.

If the size difference between the at least one value of yaw rate, deceleration, and shifting by the manual manipulation amount of the driver and the at least one value of yaw rate, deceleration, and shifting in the autonomous driving route is not less than the predetermined reference value, the switching control operation for the first switching time may be performed when there is no vehicle behavior instability or collision risk when the steering wheel manipulation, braking manipulation, and shifting manipulation of the driver are simultaneously performed, while the switching control operation for the second switching time may be performed when there is vehicle behavior instability or collision risk when the steering wheel manipulation, braking manipulation, and shifting manipulation of the driver are simultaneously performed.

If the size difference between the at least one value of yaw rate, deceleration, and shifting by the manual manipulation amount of the driver and the at least one value of yaw rate, deceleration, and shifting in the autonomous driving route is not less than the predetermined reference value, the switching control operation for the first switching time may be performed when there is no risk of collision with a rear vehicle when a driver performs a sudden braking manipulation in the hands-on state holding a steering wheel, while the switching control operation for the second switching time may be performed when there is a risk of collision with the rear vehicle when the driver performs a sudden braking manipulation in the hands-on state holding the steering wheel.

If the size difference between the at least one value of yaw rate, deceleration, and shifting by the manual manipulation amount of the driver and the at least one value of yaw rate, deceleration, and shifting in the autonomous driving route is not less than the predetermined reference value, the switching control operation for the first switching time may be performed when there is no vehicle behavior instability or collision risk when a steering angle of the steering wheel obtained by the steering wheel manipulation of the driver is not less than a reference value, while the switching control operation for the second switching time may be performed when there is vehicle behavior instability or collision risk when the steering angle of the steering wheel obtained by the steering wheel manipulation of the driver is not less than the reference value.

If the size difference between the at least one value of yaw rate, deceleration, and shifting by the manual manipulation amount of the driver and the at least one value of yaw rate, deceleration, and shifting in the autonomous driving route is not less than the predetermined reference value, the switching control operation for the first switching time may be performed when there is no vehicle behavior instability or collision risk when the shifting manipulation of the driver is performed, while the switching control operation for the second switching time may be performed when there is vehicle behavior instability or collision risk when the shifting manipulation of the driver is performed.

On the other hand, even when the size difference between the at least one value of yaw rate, deceleration, and shifting by the manual manipulation amount of the driver and the at least one value of yaw rate, deceleration, and shifting in the autonomous driving route is not less than the predetermined reference value, in case there are no driver's simultaneous manipulation for a steering wheel operation, a braking operation, and a shifting operation, no driver's sudden braking manipulation in the hands-on state holding the steering wheel, no driver's steering wheel handling manipulation, and no driver's shifting manipulation, for the switching time, the autonomous driving controller may perform a control operation to forcibly maintain a driving mode in the autonomous driving mode.

The present disclosure provides the following effects through the means for solving the above problems.

First, upon a request for switching from the autonomous driving mode to the manual driving mode while driving of the autonomous vehicle, according to the size difference between at least one value of yaw rate, deceleration, and shifting in the autonomous driving route and at least one value of yaw rate, deceleration, and shifting by the driver's manual manipulation, a time to switching from the autonomous driving mode to the manual driving mode is variably increasingly or decreasingly controlled, stably switching to the manual driving mode, securing driving safety and preventing collision accidents.

Second, when there is no manual manipulation amount according to the driver's intention to intervene in driving in the switching period switching from the autonomous driving mode to the manual driving mode, the autonomous driving mode may be forcibly maintained without switching to the manual driving mode, securing autonomous vehicle's driving safety and collision-prevention.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various exemplary embodiments of the present disclosure will be described in detail with reference to the accompanying drawings.

The present disclosure is to variably increasingly or decreasingly control a switching period, in which an autonomous driving mode of the vehicle is switched to a manual driving mode while driving of an autonomous vehicle, according to a change in the driver's manual manipulation amount to prevent vehicle deviation from a driving route and vehicle collision accident due to the fact that the driver's manual manipulation amount (the driver's manual manipulation intervention amount) may vary according to the driver's intention to intervene in driving, and the driver's driving habit and inclination in the switching period, stably switching to the manual driving mode, securing driving safety and preventing collision accidents.

Figure 1:
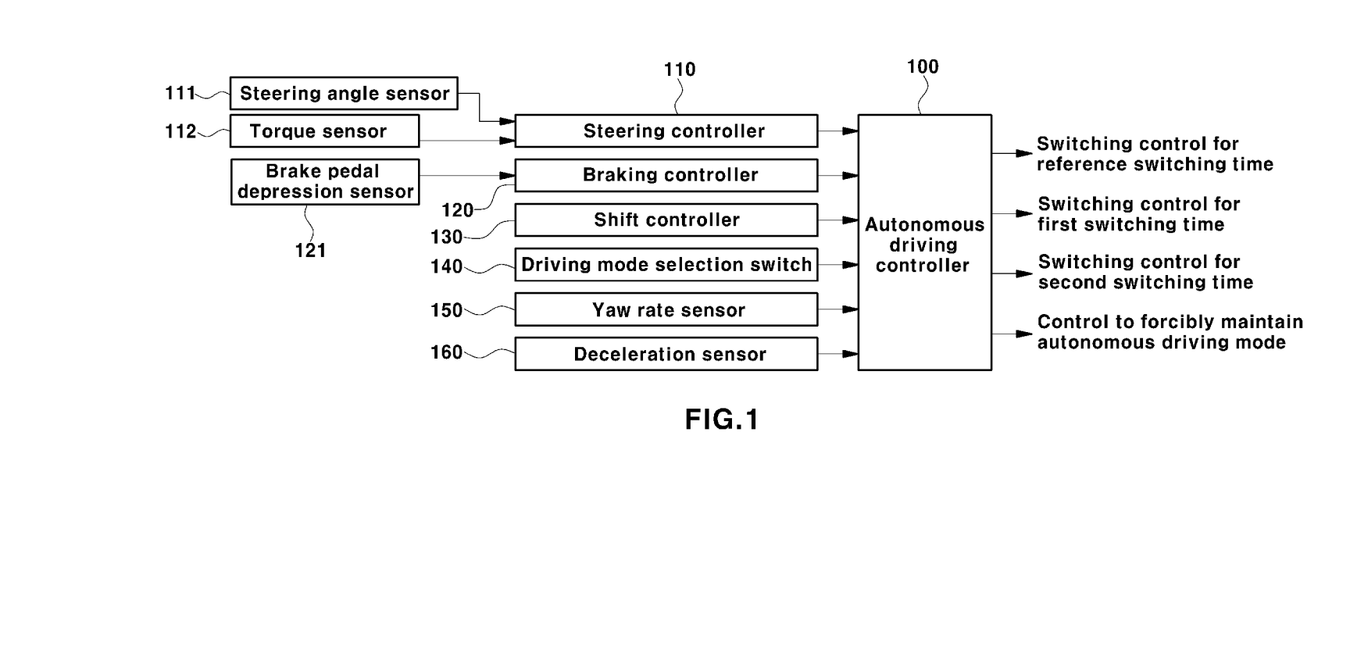
FIG. 1 and FIG. 2 are configuration diagrams for controlling a manual driving mode-switching time of an autonomous vehicle according to an exemplary embodiment of the present disclosure.
Figure 2:
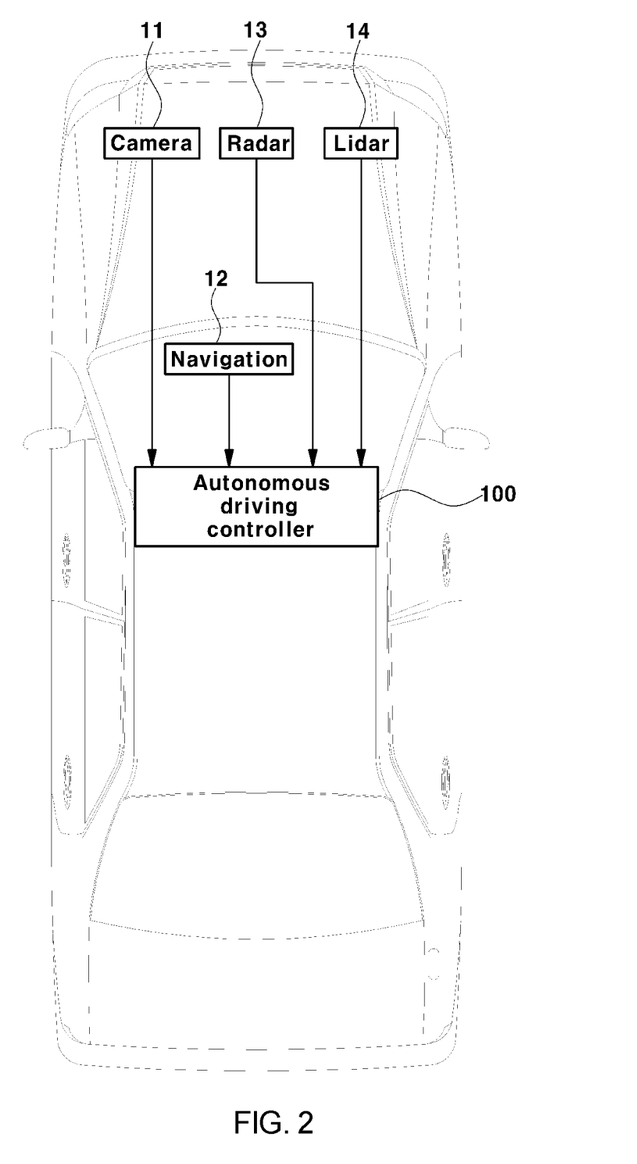

FIG. 1 and FIG. 2 are configuration diagrams for controlling a manual driving mode-switching time of an autonomous vehicle according to an exemplary embodiment of the present disclosure.

As illustrated in FIG. 1, an autonomous vehicle is provided with an autonomous driving controller 100 for overall driving control of the autonomous vehicle. A steering controller 110 for indicating whether a steering angle has occurred and whether a steering wheel has been manipulated, a braking controller 120 for indicating the depression amount of a brake pedal, and a shift controller 130 for controlling a shifting stage are communicatingly connected to an input of the autonomous driving controller 100.

The steering controller 110 may receive a detection signal of a steering angle of the steering wheel from a steering angle sensor 111 and a steering wheel manipulation detection signal from a torque sensor 112 to inform the input of the autonomous driving controller 100 of whether or not the steering angle has occurred and whether or not the steering wheel has been manipulated.

The braking controller 120 may receive a detection signal of the driver's brake pedal depression amount from a brake pedal detector (brake pedal position sensor) 121 to inform the autonomous driving controller 100 of the brake pedal depression amount.

The shift controller 130 may transmit a shift signal for selecting and controlling a shifting stage from e.g., 1st to 6th gear, to the autonomous driving controller 100.

A yaw rate sensor 150 and a deceleration sensor 160 are directly connected to the autonomous driving controller 100 to be able to transmit signals to determine whether or not the behavioral state of a vehicle is unstable.

At the present time, a driving mode selection switch 140 operable by a driver is connected to the autonomous driving controller 100 so that the autonomous driving controller is configured to perform a switching control operation in which the current driving mode is switched to an autonomous driving mode of the vehicle or a manual driving mode according to a switching signal of the driving mode selection switch 140 manipulated by a driver.

Furthermore, the autonomous driving controller 100 is configured to receive various pieces of monitoring information necessary for autonomous driving from an autonomous driving detector including a camera 11, a navigation 12, a radar 13, a Light Detection and Ranging (LiDAR) 14, or the like, which is mounted on a vehicle as illustrated in FIG. 2, and perform an overall driving control operation, such as vehicle driving direction, acceleration and deceleration, collision determination, etc., based on the monitoring information.

Here, the manual driving mode-switching time control method of present disclosure based on the above system configuration will be described in sequence as follows.

Figure 3A:
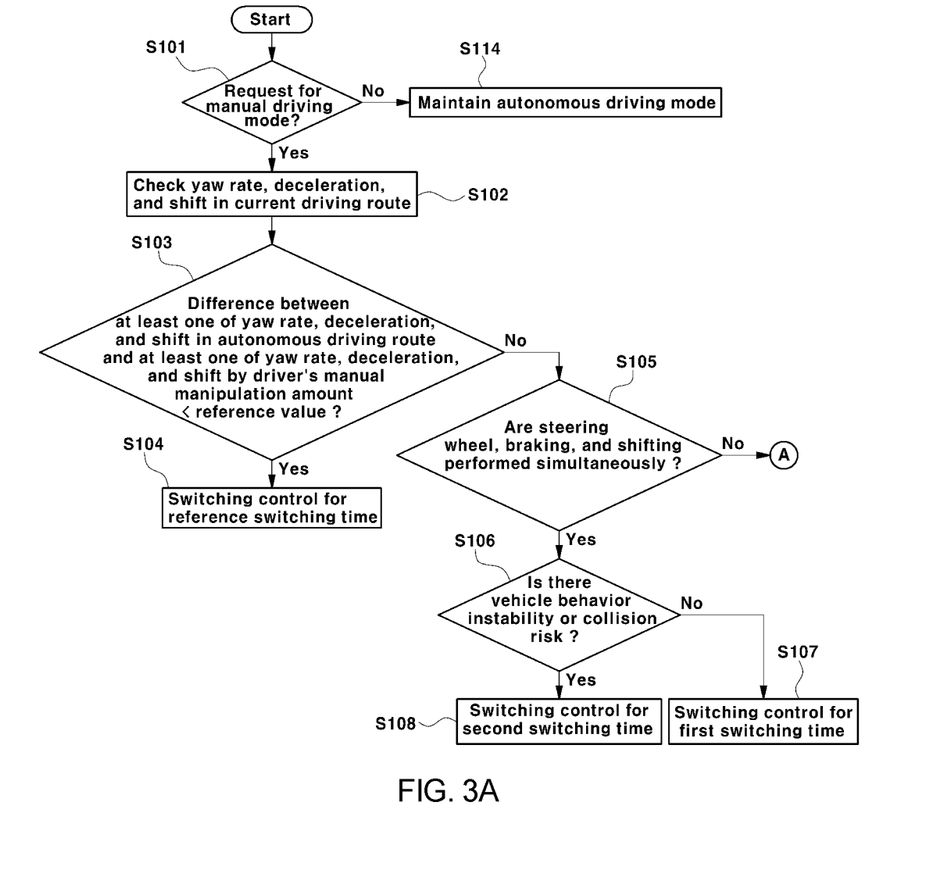
FIG. 3A and FIG. 3B are flowcharts illustrating a method of controlling a manual driving mode-switching time of an autonomous vehicle according to an exemplary embodiment of the present disclosure.
Figure 3B:
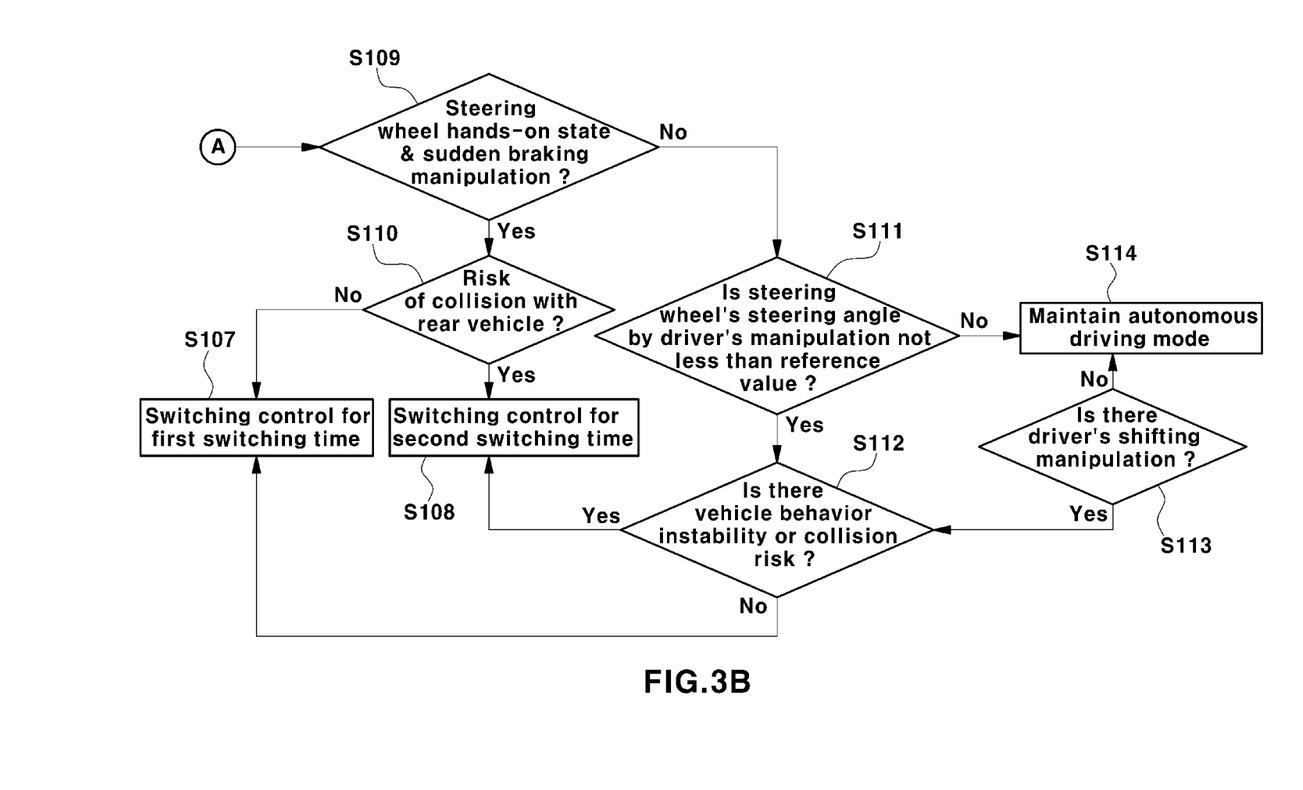

FIG. 3A and FIG. 3B are flowcharts illustrating the manual driving mode-switching time control method in the autonomous vehicle according to an exemplary embodiment of the present disclosure.

First, it is checked whether there is a driver's request for switching to the manual driving mode while driving of the autonomous vehicle (S101).

For example, when the driver selects and manipulates the manual driving mode of the driving mode selection switch 140, the autonomous driving controller 100 may confirm that there is a driver's request for switching to the manual driving mode.

Of course, when there is no driver's request for switching to the manual driving mode, the driving mode is maintained in the autonomous driving mode (S114).

On the other hand, when there is a driver's request for switching to the manual driving mode, the yaw rate, deceleration, and shifting in the current driving route are checked (S102).

That is, for the autonomous driving controller 100 to variably control the switching time for switching from the autonomous driving mode to the manual driving mode, values of the yaw rate, deceleration, and shifting by the autonomous driving control amount of the autonomous driving mode in the autonomous driving route, and values of the yaw rate, deceleration, and shifting by the driver's manual manipulation amount (the driver's manual manipulation intervention amount for the manual driving) are checked.

For example, the autonomous driving controller 100 may receive a detection signal from the yaw rate sensor 150 and a detection signal from the deceleration sensor 160 according to the autonomous driving control amount in the autonomous driving mode as well as a shift (shifting stage) manipulation signal from the shift controller 130 to check the values of the yaw rate, deceleration, and shifting according to the autonomous driving control amount. Furthermore, the autonomous driving controller 100 may receive a detection signal from the yaw rate sensor 150 and a detection signal from the deceleration sensor 160 varied according to the driver's manual manipulation amount as well as a shift (shifting stage) manipulation signal from the shift controller 130 to check the values of the yaw rate, deceleration, and shifting according to the driver's manual manipulation amount.

Next, the autonomous driving controller is configured to compare at least one value of yaw rate, deceleration and shifting in the autonomous driving path according to the autonomous driving control amount with at least one value of yaw rate, deceleration and shifting according to the driver's manual manipulation amount to determine a difference between the at least one value of yaw rate, deceleration and shifting in the autonomous driving path according to the autonomous driving control amount and the at least one value of yaw rate, deceleration and shifting according to the driver's manual manipulation amount (S103).

The autonomous driving controller is configured to compare the at least one value of yaw rate, deceleration and shifting in the autonomous driving path with the at least one value of yaw rate, deceleration and shifting according to the driver's manual manipulation amount. Subsequently, the autonomous driving controller is configured to determine whether a difference between the least one value of yaw rate, deceleration, and shifting according to the driver's manual manipulation amount and the least one value of yaw rate, deceleration, and shifting in the autonomous driving route, which corresponds to the at least one value of yaw rate, deceleration, and shifting according to the driver's manual manipulation amount is less than or not less than a predetermined reference value.

For example, the autonomous driving controller is configured to compare one value of yaw rate, deceleration and shifting in the autonomous driving path with one value of yaw rate, deceleration and shifting according to the driver's manual manipulation amount. Subsequently, the autonomous driving controller is configured to determine whether a difference between the one value of yaw rate, deceleration, and shifting according to the driver's manual manipulation amount and the one value of yaw rate, deceleration, and shifting in the autonomous driving route, which corresponds to the at least one value of yaw rate, deceleration, and shifting according to the driver's manual manipulation amount is less than or not less than a predetermined reference value.

Furthermore, the autonomous driving controller is configured to compare two values of yaw rate, deceleration and shifting in the autonomous driving path with two values of yaw rate, deceleration and shifting according to the driver's manual manipulation amount. Subsequently, the autonomous driving controller is configured to determine whether a difference between the two values of yaw rate, deceleration, and shifting according to the driver's manual manipulation amount and the two values of yaw rate, deceleration, and shifting in the autonomous driving route, which correspond to the two values of yaw rate, deceleration, and shifting according to the driver's manual manipulation amount is less than or not less than a predetermined reference value.

Furthermore, the autonomous driving controller is configured to compare all values of yaw rate, deceleration and shifting in the autonomous driving path with all values of yaw rate, deceleration and shifting according to the driver's manual manipulation amount. Subsequently, the autonomous driving controller is configured to determine whether a difference between the values of yaw rate, deceleration, and shifting according to the driver's manual manipulation amount and the values of yaw rate, deceleration, and shifting in the autonomous driving route, respectively, is less than or not less than a predetermined reference value.

Therefore, depending on the difference in size between at least one value of yaw rate, deceleration and shifting in the autonomous driving path and at least one value of yaw rate, deceleration and shifting according to the driver's manual manipulation amount, which corresponds to the at least one value of yaw rate, the autonomous driving controller is configured to perform one of switching control operations selected from switching control operations including a reference switching control operation for the reference switching time (normal switching control operation), a first switching control operation for first switching time, which is faster (shorter) than the reference switching time, and a second switching control operation for the second switching time, which is slower (increased) than the reference switching time.

As a result of the comparison in step S103, if the difference between the at least one value of yaw rate, deceleration, and shifting according to the driver's manual manipulation amount and the at least one value of yaw rate, deceleration, and shifting in the autonomous driving route, which corresponds to the at least one value of yaw rate, deceleration, and shifting according to the driver's manual manipulation amount, is less than the predetermined reference value, the autonomous driving controller is configured to perform the reference switching control operation for the predetermined reference switching time (S104).

The reference switching control operation for the reference switching time may be performed so that the sum of the autonomous driving control amount by the autonomous driving controller and the driver's manual manipulation amount satisfies a predetermined target control amount for the reference switching time from the request time for the manual driving mode.

At the present time, the reference switching time is the time required to switch from the autonomous driving mode to the manual driving mode, which may be defined as the time for a skilled driver to sufficiently switch the autonomous driving mode to the manual driving mode, that is, the time for the skilled driver to obtain the authority to control the vehicle in the autonomous driving mode to switch to the manual driving mode.

Figure 4:
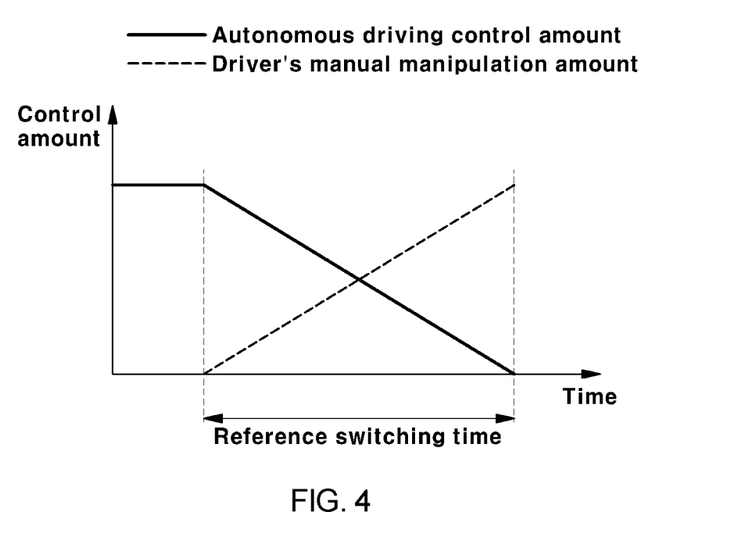
FIG. 4 is a graph illustrating an example of switching control operation for a reference switching time in the manual driving mode-switching time control method according to an exemplary embodiment of the present disclosure.

Referring to FIG. 4, the reference switching control operation for the reference switching time may be performed for the reference switching time from the request time for the manual driving mode so that for the reference switching time, the autonomous driving control amount by the autonomous driving mode decreases according to a predetermined reduction rate and at the same time, the increasing rate of the driver's manual manipulation amount is recognized. Accordingly, the autonomous driving control amount by the autonomous driving mode may gradually decrease and the driver's manual manipulation amount may gradually increase for the reference switching time.

Therefore, if the difference between at least one value of yaw rate, deceleration, and shifting according to the driver's manual manipulation amount and at least one value of yaw rate, deceleration, and shifting in the autonomous driving route, which corresponds to the at least one value of yaw rate, deceleration, and shifting according to the driver's manual manipulation amount, is less than the predetermined reference value, the autonomous driving controller is configured to perform the reference switching control operation for the predetermined reference switching time so that the sum of the autonomous driving control amount by the autonomous driving mode and the driver's manual manipulation amount satisfies a predetermined target control amount, so that the autonomous vehicle may be stably driven without a risk of collision with surrounding obstacles in the switching period in which the autonomous driving mode is switched to the manual driving mode.

On the other hand, as a result of the comparison in step S103, if the difference between at least one value of yaw rate, deceleration, and shifting according to the driver's manual manipulation amount and at least one value of yaw rate, deceleration, and shifting in the autonomous driving route, which corresponds to the at least one value of yaw rate, deceleration, and shifting according to the driver's manual manipulation amount, is not less than the predetermined reference value, the autonomous driving controller is configured to perform one of switching control operations selected from switching control operations including a first switching control operation for first switching time, which is faster (shorter) than the predetermined reference switching time, and a second switching control operation for the second switching time, which is slower (increased) than the predetermined reference switching time.

In other words, if the difference between at least one value of yaw rate, deceleration, and shifting according to the driver's manual manipulation amount and at least one value of yaw rate, deceleration, and shifting in the autonomous driving route, which corresponds to the at least one value of yaw rate, deceleration, and shifting according to the driver's manual manipulation amount, is not less than the predetermined reference value, vehicle behavior instability or collision risk may occur due to the driver's manual manipulation amount, so to prevent this, the switching control operation for the first switching time or the second switching time may be performed.

To the present end, if the difference between at least one value of yaw rate, deceleration, and shifting according to the driver's manual manipulation amount and at least one value of yaw rate, deceleration, and shifting in the autonomous driving route, which corresponds to the at least one value of yaw rate, deceleration, and shifting according to the driver's manual manipulation amount, is not less than the predetermined reference value, first, it is determined whether the steering wheel manipulation of the driver, braking manipulation, and shifting manipulation have been simultaneously performed (S105).

For example, the autonomous driving controller 100 may be configured to determine whether the steering wheel manipulation of the driver, braking manipulation, and shifting manipulation have been simultaneously performed by receiving a steering angle generation signal from the steering controller 110, receiving a brake pedal depression signal from the braking controller 120, and receiving a shifting stage-manipulation signal from the shift controller 130.

Subsequently, when it is determined that the driver's steering wheel manipulation, braking manipulation, and shifting manipulation have been simultaneously performed, the autonomous driving controller is configured to determine whether there is vehicle behavior instability or vehicle collision risk (S106).

For example, when the autonomous driving controller 100 determines whether there is vehicle behavior instability, the autonomous driving controller 100 may receive a detection signal of the yaw rate sensor 150 and a detection signal of the deceleration sensor 160, and determine vehicle behavior instability when a difference between a predetermined target yaw rate and the actual yaw rate is not less than a reference value, or a difference between a predetermined target deceleration and the actual deceleration is not less than a reference value.

For reference, the target yaw rate refers to a yaw rate value when the autonomous vehicle travels along a predetermined autonomous driving path in an autonomous driving mode.

Furthermore, when the autonomous driving controller 100 determines whether there is the vehicle collision risk, the autonomous driving controller is configured to receive various pieces of monitoring information from an autonomous driving detector including a camera 11, a navigation 12, a radar 13 or a Light Detection and Ranging (LiDAR) 14 mounted on a vehicle, and determine whether or not there is an obstacle in the vehicle driving path and whether or not there is a collision with the obstacle based on the monitoring information.

As a result of the determination in step S106, if it is determined that there is no vehicle behavior instability or collision risk, the autonomous driving controller is configured to perform the first switching control operation for the first switching time which is faster (shortened) than the reference switching time (S107).

Even if the driver's steering wheel manipulation, braking manipulation, and shifting manipulation are simultaneously performed, when there is no vehicle behavior instability or collision risk, the driver's intention to directly control the vehicle is sure, the autonomous driving controller is configured to perform the first switching control operation for the first switching time which is faster (shortened) than the reference switching time to rapidly reflect the driver's intention to intervene in manual driving.

Herein, the first switching time is a time for switching from the autonomous driving mode to the manual driving mode, which may be defined as a time obtained by shortening the time for switching the vehicle in the autonomous driving mode to the manual driving mode by a predetermined level from the above reference switching time.

The driver's simultaneous manipulation for a steering wheel operation, a braking operation, and a shifting operation may be regarded as an active expression of the skilled driver's intention to drive in a different driving route while easily overcoming a dangerous situation. Therefore, the first switching time may be defined as a time obtained by shortening the time for switching the vehicle driving mode from the autonomous driving mode to the manual driving mode by a predetermined level compared to the reference switching time to rapidly increase the driver's manipulation proportion to control the vehicle.

Figure 5:
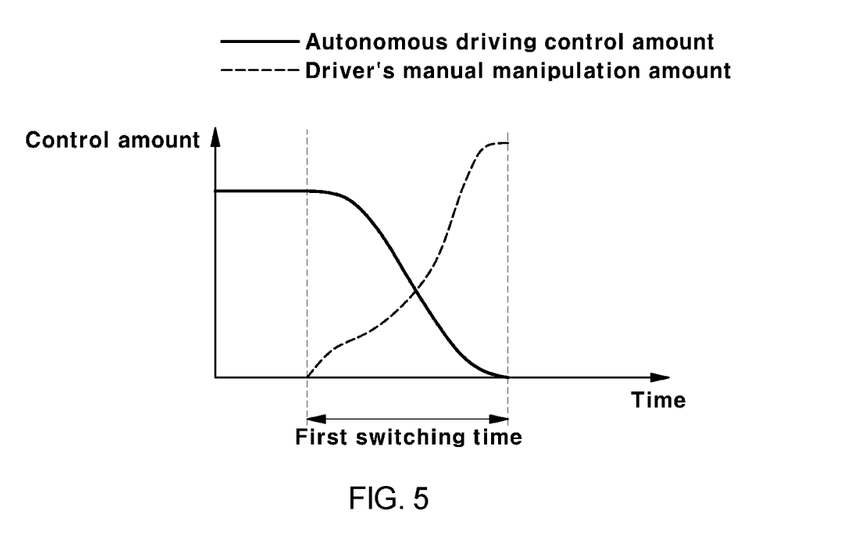
FIG. 5 is a graph illustrating an example of a switching control operation for a first switching time in the manual driving mode-switching time control method according to an exemplary embodiment of the present disclosure.

Referring to FIG. 5, the first switching control operation for the first switching time may be performed for the first switching time, which is shortened compared to the reference switching time from the request time for the manual driving mode so that for the first switching time, the autonomous driving control amount by the autonomous driving mode decreases according to a predetermined reduction rate and at the same time, the increasing rate of the driver's manual manipulation amount is recognized. Accordingly, the reduction rate of the autonomous driving control amount and the increasing rate of the driver's manual manipulation amount may increase.

In the present way, in a state in which there is no vehicle behavior instability or collision risk even upon the driver's simultaneous manipulation for a steering wheel operation, a braking operation, and a shifting operation, the first switching control operation for the first switching time is performed so that the autonomous vehicle may be stably driven without a risk of collision with surrounding obstacles for the first switching time, and the driving mode may be rapidly switched to the manual driving mode, i.e., the vehicle control authority to control the vehicle may be rapidly switched to the driver.

On the other hand, as a result of the determination in step S106, if it is determined that there is vehicle behavior instability or collision risk, the autonomous driving controller is configured to perform the second switching control operation for the second switching time which is slower (increased) than the reference switching time (S108).

Even upon the driver's simultaneous manipulation for a steering wheel operation, a braking operation, and a shifting operation, since there is vehicle behavior instability or collision risk, the autonomous driving controller is configured to perform the second switching control operation for the second switching time which is slower (increased) than the reference switching time.

Herein, the second switching time is the time for switching from the autonomous driving mode to the manual driving mode, which may be defined as a time obtained by increasing the time for switching the vehicle driving mode from the autonomous driving mode to the manual driving mode by a predetermined level compared to the above reference switching time.

The second switching time may be defined as a time which is longer than the reference switching time to provide sufficient time for the driver to manipulate the steering wheel operation, the braking operation, the shifting operation, etc., in consideration of the case in which the driver makes an operation mistake or inadvertently fails to switch to the autonomous driving mode during the manual driving mode.

Figure 6:
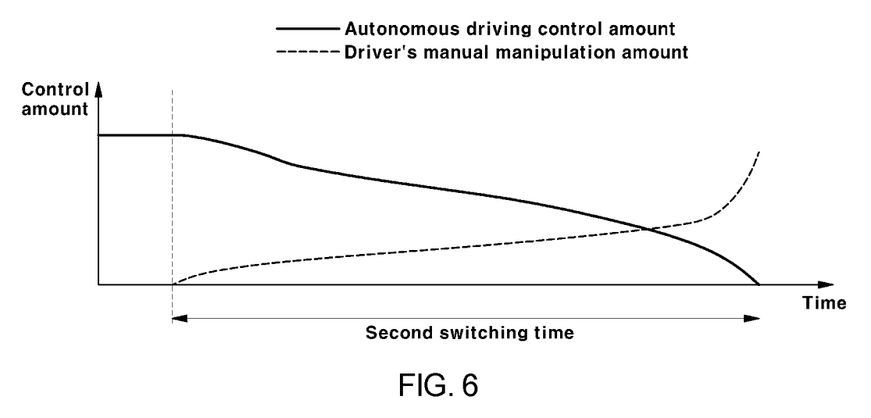
FIG. 6 is a graph illustrating an example of a switching control operation for a second switching time in the manual driving mode-switching time control method according to an exemplary embodiment of the present disclosure.

Referring to FIG. 6, the second switching control operation for the second switching time may be performed for the second switching time, which is increased compared to the reference switching time from the request time for the manual driving mode so that for the second switching time, the autonomous driving control amount decreases according to a predetermined reduction rate and at the same time, the increasing rate of the driver's manual manipulation amount is recognized. Accordingly, the reduction rate of the autonomous driving control amount and the increasing rate of the driver's manual manipulation amount may decrease.

In the present way, in a state in which there is vehicle behavior instability or collision risk even upon the driver's simultaneous manipulation for a steering wheel operation, a braking operation, and a shifting operation, the second switching control operation for the second switching time is performed so that the autonomous vehicle may be stably driven along the driving route without a risk of collision with surrounding obstacles due to the intervention of the autonomous driving control amount, and the driving mode may be rapidly switched to the manual driving mode, i.e., the vehicle control authority to control the vehicle may be rapidly switched to the driver after a sufficient time to eliminate the risk of collision.

On the other hand, as a result of the determination in step S105, if it is determined that the steering wheel manipulation of the driver, braking manipulation, and shifting manipulation are not performed simultaneously, in another exemplary embodiment of the present disclosure, it is determined whether or not the sudden braking operation is performed in a hands-on state in which the driver is holding the steering wheel (S109).

Here, when the driver requests a larger deceleration of the vehicle (when the driver requests a larger deceleration of the vehicle by manipulating a brake pedal with a stroke not less than a braking force commanded by the autonomous driving controller), the driver may perform the sudden braking manipulation.

For example, in determining whether the sudden braking manipulation has been performed, the autonomous driving controller 100 may detect the minute torque from a torque sensor 112 mounted on the steering wheel, determine the hands-on state in which the driver is holding the steering wheel when receiving the torque signal from the steering controller 110, and determine the sudden braking manipulation when receiving a brake pedal depression signal from the braking controller 120.

Subsequently, when it is determined that the sudden braking manipulation has been performed in the hands-on state in which the driver is holding the steering wheel, the autonomous driving controller is configured to determine whether there is a risk of collision with a rear vehicle (S110).

For example, when the autonomous driving controller 100 determines whether there is the risk of collision with the rear vehicle, the autonomous driving controller is configured to receive various pieces of monitoring information from an autonomous driving detector including a camera 11, a navigation 12, a radar 13, or a Light Detection and Ranging (LiDAR) 14 mounted on a vehicle and determine whether there is a rear vehicle or the like behind the autonomous vehicle as well as whether there is a collision with the rear vehicle based on the monitoring information.

As a result of the determination in step S110, if it is determined that there is no risk of collision with the rear vehicle, the autonomous driving controller is configured to perform the first switching control operation for the first switching time which is faster (shortened) than the reference switching time (S107).

Even if a sudden braking operation is performed in a hands-on state in which the driver is holding the steering wheel, if there is no risk of collision with the rear vehicle, the driver's intention to directly control the vehicle is sure. Therefore, to rapidly reflect the driver's intention to intervene in manual driving, the autonomous driving controller is configured to perform the first switching control operation for the first switching time which is faster (shortened) than the reference switching time.

Here, as described above with reference to FIG. 5, the first switching control operation for the first switching time may be performed for the first switching time, which is shortened compared to the reference switching time from the request time for the manual driving mode so that for the first switching time, the autonomous driving control amount decreases according to a predetermined reduction rate and at the same time, the increasing rate of the driver's manual manipulation amount is recognized. Accordingly, the reduction rate of the autonomous driving control amount and the increasing rate of the driver's manual manipulation amount may increase.

In the present way, in a state in which there is no risk of collision with the rear vehicle even upon the hands-on state in which the driver is holding the steering wheel, the first switching control operation for the first switching time is performed so that the autonomous vehicle may be stably driven without a risk of collision with rear obstacles for the first switching time, and the driving mode may be rapidly switched to the manual driving mode, i.e., the vehicle control authority to control the vehicle may be rapidly switched to the driver.

On the other hand, as a result of the determination in step S110, if it is determined that there is a risk of collision with a rear vehicle, the autonomous driving controller is configured to perform the second switching control operation for the second switching time which is slower (increased) than the reference switching time (S108).

Even upon the sudden braking operation in a driver's hands-on state, the autonomous driving controller is configured to perform the second switching control operation for the second switching time which is slower (increased) than the reference switching time to prevent the risk of collision with the rear vehicle.

As described above with reference to FIG. 6, the second switching control operation for the second switching time may be performed for the second switching time, which is increased compared to the reference switching time from the request time for the manual driving mode so that for the second switching time, the autonomous driving control amount decreases according to a predetermined reduction rate and at the same time, the increasing rate of the driver's manual manipulation amount is recognized. Accordingly, the reduction rate of the autonomous driving control amount and the increasing rate of the driver's manual manipulation amount may decrease.

Here, if there is a risk of collision with a rear vehicle, the autonomous driving controller is configured to perform a control operation to reduce the deceleration by the driver's sudden braking operation according to the autonomous driving control amount, preventing the risk of collision with the rear vehicle and securing a safety distance.

In the present way, in a state in which there is a risk of collision with a rear vehicle upon the hands-on state in which the driver is holding the steering wheel, the second switching control operation for the second switching time is performed so that the intervention of the autonomous driving control amount may be performed for the second switching time, which is increased compared to the reference switching time. Accordingly, the autonomous vehicle may be safely driven while preventing the risk of collision with a rear obstacle according to the intervention of the autonomous driving control amount, and the driving mode may be rapidly switched to the manual driving mode, i.e., the vehicle control authority to control the vehicle may be rapidly switched to the driver after a sufficient time to eliminate the risk of collision.

On the other hand, as a result of the determination in step S109, if it is determined that there is no sudden braking operation, in another exemplary embodiment of the present disclosure, it is determined whether a steering angle of the steering wheel by the driver's manipulation is not less than a reference value (S111).

That is, it is determined whether the steering angle of the steering wheel according to the driver's manipulation is not less than a reference value to determine whether the autonomous vehicle deviates from a target driving route to another route due to the driver's steering wheel manipulation.

For example, the autonomous driving controller 100 may receive a steering wheel angle detection signal of the steering angle sensor 111 from the steering controller 110 and determine whether the steering angle of the steering wheel by the driver's manipulation is not less than a reference value.

Subsequently, if it is determined that the steering angle of the steering wheel by the driver's manipulation is not less than the reference value, the autonomous driving controller is configured to determine whether there is vehicle behavior instability or collision risk (S112).

For example, when the autonomous driving controller 100 determines whether there is vehicle behavior instability, the autonomous driving controller is configured to receive a detection signal of the yaw rate sensor 150 and a detection signal of the deceleration sensor 160, and determine that the vehicle behavior is unstable when a difference between a predetermined target yaw rate and an actual yaw rate is not less than a reference value or a difference between a predetermined target deceleration and an actual deceleration is not less than a reference value.

Furthermore, when the autonomous driving controller 100 determines whether there is a vehicle collision risk, the autonomous driving controller is configured to receive various pieces of monitoring information from an autonomous driving detector including a camera 11, a navigation 12, a radar 13, or a Light Detection and Ranging (LiDAR) 14 mounted on a vehicle and determine whether there is an obstacle in the vehicle driving route as well as whether there is a collision with the obstacle based on the monitoring information.

As a result of the determination in step S112, if it is determined that there is no vehicle behavior instability or collision risk, the autonomous driving controller is configured to perform the first switching control operation for the first switching time which is faster (shortened) than the reference switching time (S107).

Even if the steering angle of the steering wheel by the driver's manipulation is not less than the reference value, if there is no vehicle behavior instability or collision risk, the driver's intention to directly steer the vehicle is sure. Therefore, to rapidly reflect the driver's intention to intervene in manual driving, the autonomous driving controller is configured to perform the first switching control operation for the first switching time which is faster (shortened) than the reference switching time.

Here, as described above with reference to FIG. 5, the first switching control operation for the first switching time may be performed for the first switching time, which is shortened compared to the reference switching time from the request time for the manual driving mode so that for the first switching time, the autonomous driving control amount decreases according to a predetermined reduction rate and at the same time, the increasing rate of the driver's manual manipulation amount is recognized. Accordingly, the reduction rate of the autonomous driving control amount and the increasing rate of the driver's manual manipulation amount may increase.

In the present way, in a state in which there is no vehicle behavior instability or collision risk even if the steering angle of the steering wheel by the driver's manipulation is not less than the reference value, the first switching control operation for the first switching time is performed so that the autonomous vehicle may be stably turned or lane-changed without a risk of collision with surrounding obstacles for the first switching time, and the driver's intention to directly steer the vehicle is sure, so that the driving mode may be rapidly switched to the manual driving mode, i.e., the vehicle control authority to control the vehicle may be rapidly switched to the driver.

On the other hand, as a result of the determination in step S112, if it is determined that there is vehicle behavior instability or collision risk, the autonomous driving controller is configured to perform the second switching control operation for the second switching time which is slower (increased) than the reference switching time (S108).

Because there is vehicle behavior instability or collision risk even if the steering angle of the steering wheel by the driver's manipulation is not less than the reference value, the autonomous driving controller is configured to perform the second switching control operation for the second switching time which is slower (increased) than the reference switching time.

Here, as described above with reference to FIG. 6, the second switching control operation for the second switching time may be performed for the second switching time, which is increased compared to the reference switching time from the request time for the manual driving mode so that for the second switching time, the autonomous driving control amount decreases according to a predetermined reduction rate and at the same time, the increasing rate of the driver's manual manipulation amount is recognized. Accordingly, the reduction rate of the autonomous driving control amount and the increasing rate of the driver's manual manipulation amount may decrease.

In the present way, in a state in which there is vehicle behavior instability or collision risk even if the steering angle of the steering wheel by the driver's manipulation is not less than the reference value, the second switching control operation for the second switching time is performed so that the intervention of the steering control according to the autonomous driving control amount for preventing the vehicle collision may be performed for the second switching time so that the autonomous vehicle may be stably driven along a driving route without a risk of collision with surrounding obstacles due to the intervention of the steering control according to the autonomous driving control amount, and the driving mode may be rapidly switched to the manual driving mode, i.e., the vehicle control authority to control the vehicle may be rapidly switched to the driver after a sufficient time to eliminate collision risk.

On the other hand, as a result of the determination in step S111, if it is determined that the steering angle of the steering wheel by the driver's manipulation is less than the reference value, in another exemplary embodiment of the present disclosure, it is determined whether or not the shifting manipulation of the driver has been performed (S113).

For example, if the driver wants to decelerate while the autonomous driving vehicle is driving down a slope, the driver may manipulate the shifting stage from the higher state to the lower stage, or if the autonomous driving vehicle drives with a torque smaller than the driver's desired drive torque while driving up a hill, the driver may feel stuffy and manipulate the shifting stage to the lower stage. In the instant case, the autonomous driving controller 100 may receive a shift manipulation signal from the shift controller 130 and determine whether there is the shifting manipulation of the driver.

Subsequently, if it is determined that there is the shifting manipulation of the driver, the autonomous driving controller is configured to determine whether there is vehicle behavior instability or collision risk (S112).

For example, when the autonomous driving controller 100 determines whether there is vehicle behavior instability, the autonomous driving controller is configured to receive a detection signal of the yaw rate sensor 150 and a detection signal of the deceleration sensor 160, and determine that the vehicle behavior is unstable when a difference between a predetermined target yaw rate and an actual yaw rate is not less than a reference value or a difference between a predetermined target deceleration and an actual deceleration is not less than a reference value.

Furthermore, when the autonomous driving controller 100 determines whether there is a vehicle collision risk, the autonomous driving controller is configured to receive various pieces of monitoring information from an autonomous driving detector including a camera 11, a navigation 12, a radar 13, or a Light Detection and Ranging (LiDAR) 14 mounted on a vehicle and determine whether there is an obstacle in the vehicle driving route as well as whether there is a collision with the obstacle based on the monitoring information.

As a result of the determination in step S112, if it is determined that there is no vehicle behavior instability or collision risk, the autonomous driving controller is configured to perform the first switching control operation for the first switching time which is faster (shortened) than the reference switching time (S107).

Even if the shifting manipulation of the driver is performed, if there is no vehicle behavior instability or collision risk, the driver's intention to directly steer the vehicle is sure. Therefore, to rapidly reflect the driver's intention to intervene in manual driving, the autonomous driving controller is configured to perform the first switching control operation for the first switching time which is faster (shortened) than the reference switching time.

Here, as described above with reference to FIG. 5, the first switching control operation for the first switching time may be performed for the first switching time, which is shortened compared to the reference switching time from the request time for the manual driving mode so that for the first switching time, the autonomous driving control amount decreases according to a predetermined reduction rate and at the same time, the increasing rate of the driver's manual manipulation amount is recognized. Accordingly, the reduction rate of the autonomous driving control amount and the increasing rate of the driver's manual manipulation amount may increase.

In the present way, in a state in which there is no vehicle behavior instability or collision risk even if the shifting manipulation of the driver is performed, the first switching control operation for the first switching time is performed so that the autonomous vehicle may be stably shift-manipulated and driven without a risk of collision with surrounding obstacles for the first switching time, and the driver's intention to directly shift the vehicle is sure, so that the driving mode may be rapidly switched to the manual driving mode, i.e., the vehicle control authority to control the vehicle may be rapidly switched to the driver.

On the other hand, as a result of the determination in step S112, if it is determined that there is vehicle behavior instability or collision risk, the autonomous driving controller is configured to perform the second switching control operation for the second switching time which is slower (increased) than the reference switching time (S108).

Since there is vehicle behavior instability or collision risk even if the shifting manipulation of the driver is performed, the autonomous driving controller is configured to perform the second switching control operation for the second switching time which is slower (increased) than the reference switching time to prevent collision risk.

Here, as described above with reference to FIG. 6, the second switching control operation for the second switching time may be performed for the second switching time, which is increased compared to the reference switching time from the request time for the manual driving mode so that for the second switching time, the autonomous driving control amount decreases according to a predetermined reduction rate and at the same time, the increasing rate of the driver's manual manipulation amount is recognized. Accordingly, the reduction rate of the autonomous driving control amount and the increasing rate of the driver's manual manipulation amount may decrease.

In the present way, in a state in which there is vehicle behavior instability or collision risk even if the shifting manipulation of the driver is performed, the second switching control operation for the second switching time is performed so that the shifting control intervention according to the autonomous driving control amount may be performed for the second switching time which is increased compared to the reference switching time, and accordingly, the autonomous vehicle may be stably driven along a driving route without a risk of collision with surrounding obstacles due to the shifting control intervention according to the autonomous driving control amount, and the driving mode may be rapidly switched to the manual driving mode, i.e., the vehicle control authority to control the vehicle may be rapidly switched to the driver after a sufficient time to eliminate collision risk.

On the other hand, as a result of the determination in step S113, if it is determined that there is no driver's shifting manipulation, it is determined that there is no driver's manual manipulation, so that the autonomous driving controller is configured to perform a control operation to maintain the current driving mode in the autonomous driving mode (S114).

Figure 7:
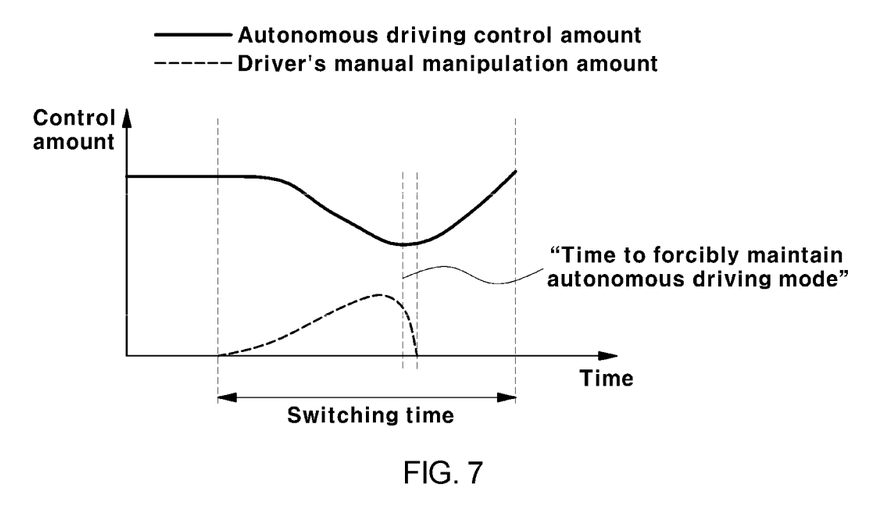
FIG. 7 is a graph illustrating an exemplary control operation of forcibly maintaining an autonomous driving mode of the vehicle in the manual driving mode-switching time control method according to an exemplary embodiment of the present disclosure.

Referring to FIG. 7, when the driver's manual manipulation amount is significantly less than the autonomous driving control amount by the reference value or more, or there is no driver's manual manipulation amount for the switching time from the driver's request time for the manual driving mode, it is determined that the driver cannot directly manually operates the vehicle, so that a control operation is performed to forcibly maintain the current driving mode in the autonomous driving mode.

Although there was a driver's request for the manual driving mode, when there was no driver's manual manipulation including driver's simultaneous manipulation for a steering wheel operation, a braking operation, and a shifting operation, driver's sudden braking manipulation in the hands-on state holding the steering wheel, driver's steering wheel handling manipulation, and driver's shifting manipulation, for the switching time from the autonomous driving mode to the manual driving mode, the autonomous driving controller may determine that the driver cannot directly manually operate the vehicle to perform a control operation to maintain the current driving mode in the autonomous driving mode.

In other words, even if the size difference between at least one value of yaw rate, deceleration, and shifting by the driver's manual manipulation amount and at least one value of yaw rate, deceleration, and shifting in the autonomous driving route, which corresponds to the at least one value of yaw rate, deceleration, and shifting by the driver's manual manipulation amount, is not less than the predetermined reference value, in case there are no driver's simultaneous manipulation for a steering wheel operation, a braking operation, and a shifting operation, no driver's sudden braking manipulation in the hands-on state holding the steering wheel, no driver's steering wheel handling manipulation, and no driver's shifting manipulation, for the switching time from the autonomous driving mode to the manual driving mode, the autonomous driving controller is configured to determine that the driver cannot directly manually operate the vehicle even upon the driver's request for switching to the manual driving mode and performs a control operation to forcibly maintain the current driving mode in the autonomous driving mode for safe driving.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may be configured to generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the scope of the present disclosure includes software or machine-executable commands (e.g., an operating system, an application, firmware, a program, etc.) for facilitating operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A method of controlling a time switching to a manual driving mode of a vehicle, the method comprising:
   determining, by an autonomous driving controller, whether there is a request for switching to the manual driving mode while driving of the vehicle;
   comparing, by the autonomous driving controller, at least one of yaw rate, deceleration, and gear ratio on an autonomous driving mode of the vehicle with at least one of yaw rate, deceleration, and gear ratio as changed by a manual manipulation amount of a driver when the autonomous driving controller concludes that there is the request for switching to the manual driving mode; and
   as a result of the comparing, according to a difference between the at least one value of yaw rate, deceleration, and shifting in an autonomous driving route and the at least one value of yaw rate, deceleration, and shifting by the manual manipulation amount of the driver, performing, by the autonomous driving controller, a switching control operation of variably increasingly or decreasingly controlling a time for switching from the autonomous driving mode to the manual driving mode.

2. The method of claim 1, wherein when the difference between the at least one value of yaw rate, deceleration, and shifting by the manual manipulation amount of the driver and the at least one value of yaw rate, deceleration, and shifting in the autonomous driving route is less than a predetermined reference value, the autonomous driving controller is configured to perform the switching control operation for a predetermined reference switching time.

3. The method of claim 2, wherein the switching control operation for the predetermined reference switching time is performed so that a sum of an autonomous driving control amount of the autonomous driving controller and the manual manipulation amount of the driver meets a predetermined target control amount for the predetermined reference switching time from a request time for the manual driving mode.

4. The method of claim 1, wherein when a size difference between the at least one value of yaw rate, deceleration, and shifting by the manual manipulation amount of the driver and the at least one value of yaw rate, deceleration, and shifting in the autonomous driving route is not less than a predetermined reference value, the autonomous driving controller is configured to perform the switching control operation for a first switching time faster than a predetermined reference switching time or a second switching time slower than the predetermined reference switching time.

5. The method of claim 4, wherein the first switching time is determined as a time obtained by shortening the time switching from the autonomous driving mode to the manual driving mode by a predetermined level compared to the predetermined reference switching time.

6. The method of claim 4, wherein the second switching time is determined as a time obtained by increasing the time switching from the autonomous driving mode to the manual driving mode by a predetermined level compared to the predetermined reference switching time.

7. The method of claim 4, wherein the switching control operation for the first switching time is performed when there is no vehicle behavior instability or collision risk when steering wheel manipulation, braking manipulation, and shifting manipulation of the driver are all simultaneously performed.

8. The method of claim 4, wherein the switching control operation for the second switching time is performed when there is vehicle behavior instability or collision risk when steering wheel manipulation, braking manipulation, and shifting manipulation of the driver are all simultaneously performed.

9. The method of claim 4, wherein the switching control operation for the first switching time is performed when there is no risk of collision with a rear vehicle when the driver performs a sudden braking manipulation in a hands-on state holding a steering wheel.

10. The method of claim 4, wherein the switching control operation for the second switching time is performed when there is a risk of collision with a rear vehicle when the driver performs a sudden braking manipulation in a hands-on state holding a steering wheel.

11. The method of claim 4, wherein the switching control operation for the first switching time is performed when there is no vehicle behavior instability or collision risk when a steering angle of a steering wheel obtained by steering wheel manipulation of the driver is not less than a reference value.

12. The method of claim 4, wherein the switching control operation for the second switching time is performed when there is vehicle behavior instability or collision risk when the steering angle of the steering wheel obtained by the steering wheel manipulation of the driver is not less than the reference value.

13. The method of claim 4, wherein the switching control operation for the first switching time is performed when there is no vehicle behavior instability or collision risk when shifting manipulation of the driver is performed.

14. The method of claim 4, wherein the switching control operation for the second switching time is performed when there is vehicle behavior instability or collision risk when shifting manipulation of the driver is performed.

15. The method of claim 4, wherein even when the size difference between the at least one value of yaw rate, deceleration, and shifting by the manual manipulation amount of the driver and the at least one value of yaw rate, deceleration, and shifting in the autonomous driving route is not less than the predetermined reference value, in case there are no simultaneous manipulation of the driver for a steering wheel operation, a braking operation, and a shifting operation, no sudden braking manipulation of the driver in a hands-on state holding a steering wheel, no steering wheel handling manipulation of the driver, and no shifting manipulation of the driver, for the switching time, the autonomous driving controller is configured to perform a control operation to forcibly maintain a driving mode in the autonomous driving mode.

16. The method of claim 4, wherein the autonomous driving control amount by the autonomous driving mode decreases according to a predetermined reduction rate and at the same time, the driver's manual manipulation amount by the manual driving mode increases according to a predetermined increasing rate.

17. A non-transitory computer readable storage medium on which a program for performing the method of claim 1 is recorded.

18. A method of controlling a time switching to a manual driving mode of a vehicle, the method comprising:
  determining, by an autonomous driving controller, whether there is a request for switching to the manual driving mode while driving of the vehicle;
  comparing, by the autonomous driving controller, at least one of yaw rate, deceleration, and gear ratio on an autonomous driving mode of the vehicle with at least one of yaw rate, deceleration, and gear ratio as changed by a manual manipulation amount of a driver when the autonomous driving controller concludes that there is the request for switching to the manual driving mode; and
  as a result of the comparing, according to a difference between the at least one value of yaw rate, deceleration, and shifting in an autonomous driving route and the at least one value of yaw rate, deceleration, and shifting by the manual manipulation amount of the driver, performing, by the autonomous driving controller, a switching control operation of variably controlling a switching time length for switching from the autonomous driving mode to the manual driving mode.

* * * * *